Figure 1:
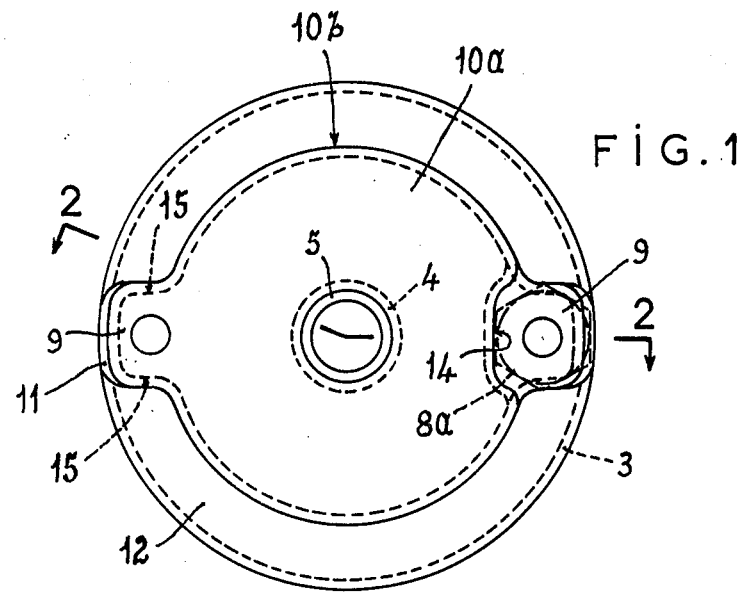

United States Patent [19]

Mazzorana

[11] 4,164,673
[45] Aug. 14, 1979

[54] BEARING MADE OF STAMPED (EMBOSSED) SHEET IRON

[75] Inventor: Alfred B. Mazzorana, Venissieux, France

[73] Assignee: Societe de Paris et du Rhone, Lyons, France

[21] Appl. No.: 869,594

[22] Filed: Jan. 16, 1978

[30] Foreign Application Priority Data

Jan. 18, 1977 [FR] France ................................. 77 01833

[51] Int. Cl.$^2$ ......................... H02K 5/00; F16C 35/00
[52] U.S. Cl. ........................................ 310/89; 308/15; 308/245; 310/90
[58] Field of Search ............... 308/15, 30, 237 R, 245; 310/68 D, 89, 90

[56] References Cited

U.S. PATENT DOCUMENTS

| | | | |
|---|---|---|---|
| 2,795,713 | 6/1957 | Woll et al. | 310/89 |
| 3,182,215 | 5/1965 | DuBois et al. | 310/89 |
| 3,484,934 | 12/1969 | Wightman | 310/90 |

FOREIGN PATENT DOCUMENTS 2156004  5/1973  Fed. Rep. of Germany ............. 310/89

*Primary Examiner*—Charles E. Frankfort
*Attorney, Agent, or Firm*—Browdy and Neimark

[57] ABSTRACT

A "bell-shaped" type of bearing of swaged sheet metal in the form of a container bordered by a cylindrical skirt having a central duct for the accommodation of a bearing bush is held to a rotor magnetic circuit of an electric machine by at least two tie rods passing through the bearing in a direction substantially parallel to the axis of the duct for the bushing. The support zones on the bearing against which the heads of the tie rods abut are provided with at least one swaged rib extending continuously across and between the zones and up to the skirt of the bearing to form a box girder.

10 Claims, 3 Drawing Figures

BEARING MADE OF STAMPED (EMBOSSED) SHEET IRON

This invention relates to a "bell-shaped" type of bearing made of swaged sheet metal, that is to say shaped in the form of a container bordered by a cylindrical skirt intended to be supported by at least two assembly tie rods on a shoulder on a rotor magnetic circuit and comprising a central duct intended to take a bushing of the bearing.

Assembly of this type of bearing on the rotor magnetic circuit is effected by means of tie rods traversing this bearing between the central duct and the cylindrical skirt and which are therefore necessarily off-set in relation to the magnetic circuit shoulder.

The result is the formation of a couple which tends to deform the bearing. Now, this deformation may involve misalignment of the bearing bushing compared with the bushing of the other bearing, the result of which may be not only bad centering of the armature in relation to the rotor but in addition friction forces ending up with premature wearing of the bushings.

This invention is intended to overcome these disadvantages.

For this purpose, the zones provided for the passage and support of the assembly tie rods are provided with at least one swaged rib connecting them without loss of continuity and extending up to the cylindrical skirt so as to form at least one box girder.

This rib reinforces the rigidity of the bearing and eliminates practically any risk of bending under the action of the assembly tie rods.

In one simple embodiment of the invention, where only two tie rods are provided in diametrically opposite zones, in its central section, the swaged rib has the shape of a cupola, the cylindrical edge of which is concentric with the central duct.

Advantageously, to give a better distribution of the loads, the diameter of the cupola-shaped central section of the rib is largely equal to the distance between centers of the assembly tie rods.

As a result of another advantageous characteristic of the invention, again to improve the rigidities of the bearing, the cylindrical edge of the container-shaped central section of the rib is connected to the cylindrical skirt of the bearing by a section shaped like the frustum of a cone.

To provide accommodation for the heads of the tie rods, in accordance with another characteristics of the invention, the support zones for the tie rods provided at the ends of the rib have an end fitting, the vertical wall of which constitutes an element for connecting the ends opposite the cylindrical edge of the cupola-shaped central section of the rib. This not only gives an improvement in the rigidity of the bearing, but in addition the aforementioned vertical wall may be used to advantage to stop rotation of the head of the tie rod.

Figure 2:
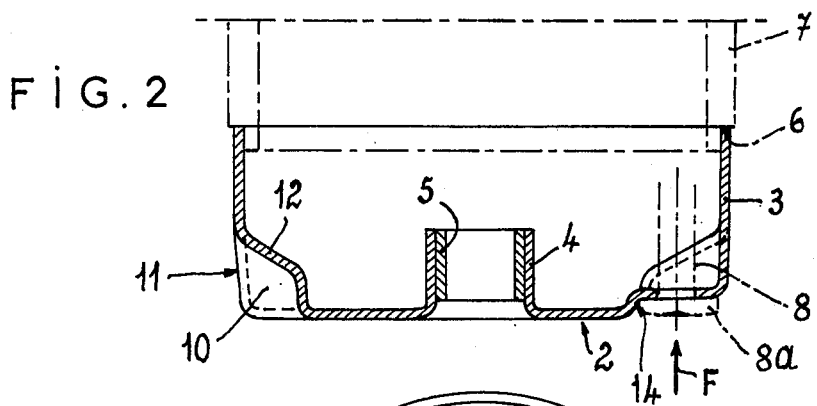
Figure 3:
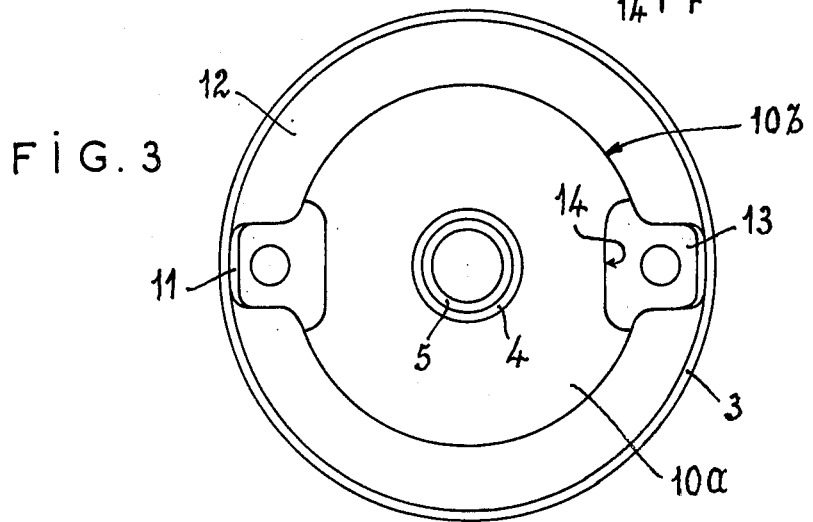

Whatever the circumstances the invention will be well understood from the description which follows, with references to the drawings attached hereto, showing as a non-exhaustive example, an embodiment of a swaged sheet metal bearing:

FIG. 1 is an elevation of its outside face;
FIG. 2 is a section view along 2—2 of FIG. 1;
FIG. 3 is an elevation of its inside face.

A swaged sheet metal bearing is of the type shaped like a container with a bottom 2 surrounded by cylindrical skirt 3 at the center of which a cylindrical duct 4 is provided, intended to accommodate a bearing bushing 5.

The free edge of cylindrical skirt 3 is intended to be supported on a shoulder 6 of rotor magnetic circuit 7, and the assembly is held by means of tie rods 8. These tie rods cross the bearing in a zone which must be located between skirt 3 and central duct 4, and preferably as close as possible to cylindrical skirt 3. In fact, the head 8a of the tie rods being supported on bottom 2 of the bearing necessarily causes a tilting stress since force F which it causes must be displaced transversely in relation to cylindrical skirt 3.

It can be perceived easily that this force F tends to deform the bottom of bearing 2, which may be the cause of a number of disadvantages such as the misalignment of bushings 5, particularly in the case of uneven tightening of the tie rods, the bringing-together of two bushings assembled on one and the same armature, friction force causing premature wear, de-centering of the rotor in relation to the armature, hence operation under bad conditions.

In accordance with the invention, zones 9 provided for the passage and support of tie rods 8, are provided in at least one rib 10 swaged on the bearing, connecting the said zones without loss of continuity. Where only two tie rods are provided located at diametrically opposite points, rib 10 extends radially in bottom 2 of the bearing.

As shown on the drawing, this rib 10 extends beyond zones 9 up to cylindrical skirt 3 to which is connected preferably with a slope forming a rake or clearance, as illustrated at 11 on the drawing.

As the drawing shows, in order to avoid difficulty due to the presence of central duct 4 and to ensure better distribution of the stresses in the bearing, the central section of rib 10 has the shape of a cupola 10a, the cylindrical edge 10b of which is concentric with central duct 4.

The bending strength conditions of bearing bottom 2 are obtained by giving cupola 10a a diameter largely equal to the distance between centers of tie rods 8.

To improve the rigidity of bearing bottom 2, the edge of cupola 10a forming the central section of rib 10 is connected to cylindrical skirt 3 of the bearing by a section 12 having the shape of a truncated cone, the presence of which has the effect of increasing the resistance to bending of bearing bottom 2.

Preferably, to avoid any weakening of the bottom of the rib due to the pressure exercised by assembly tie rods 8, side vertical walls 15 of rib 10 on either side of the holes provided for the passage of tie rods 8 are arranged as near as possible to each other and in any case at a distance less than the width of heads 8a of tie rods 8. Therefore, the tension of tie rods 8 is supported directly by walls 15.

To improve further the resistance to bending of the bottom of this bearing, support zones 9 for heads 8a of tie rods 8 are provided in swaged bottom 13, the vertical wall 14 of which constitutes a stiffening element connecting the ends of opposed part-cylindrical edges 10b of cupola 10a. This vertical wall 14 may in addition be used to advantage to constitute an element stopping the rotation of the corresponding head 8a of tie rod 8.

Tests carried out with this bearing and compared with tests carried out with other well-known bearings have shown the manifest superiority of its resistance to bending and, consequently, to deformation.

Finally, by selecting a measuring point located on bearing bottom 2 near central duct 4, it was possible to find what with equal axial load F, the deformation of the bearing in accordance with this invention is at least four times less than that measured on the least deformable bearings known at present and ten to twenty times less than that of a bearing with a simple structure comprising for example, simply a cylindrical skirt and a flat bottom, and this applies even if two bosses are provided to serve as a support for the heads of the assembly tie rods.

As is obvious and as can be seen from the foregoing, the invention is not limited to the sole embodiment of this bearing described as a non-limiting example, on the contrary it also covers any variants.

We claim:

1. A bell-shaped type swaged sheet metal bearing in the form of a container bordered by a cylindrical skirt intended to be supported by at least two assembly tie rods on a shoulder of a rotor magnetic circuit, the bearing comprising a central duct adapted to accommodate a bearing bushing, at least one swaged rib integral with said skirt, having two ends and having two respective apertured areas near respective ones of said ends for the passage and support of the assembly tie rods, said rib extending without loss of continuity between said apertured areas and extending outwardly up to said cylindrical skirt beyond said aperture areas so as to form at least one box girder, said ends of said rib being substantially coplanar with said skirt.

2. A bearing in accordance with claim 1, in which only two tie rods are provided in diametrically opposite said apertured areas of said swaged rib, having a central section in the shape of a cupola having a cylindrical edge, said cylindrical edge being concentric with said central duct.

3. A bearing in accordance with claim 2, in which said cylindrical edge of said central cupola-shaped section of the bearing is connected to said cylindrical skirt of the bearing by a section shaped as a truncated cone, whereby rigidity of the bearing is further improved.

4. A bearing in accordance with claim 2, in which to provide accommodation for the heads of the tie rods, support zones are provided at said ends of said rib and have an end fitting, a vertical wall of which constitutes both an element connecting said ends opposite said cylindrical edge of said central cupola-shaped section of said rib and an element stopping rotation of a head of a corresponding tie rod.

5. A bearing in accordance with claim 2, in which at the level of tie rod support zones, that is at said ends of said rib, side vertical walls of said rib, located on either side of apertures provided for passage of the tie rods, are arranged as near as possible to one another and at a distance less than the width of the heads of the tie rods.

6. A bearing in accordance with claim 2, in which for better distribution of the loads, the diameter of said central cupola-shaped section of said rib is substantially equal to the distance between centers of the assembly tie rods.

7. A bearing in accordance with claim 6, in which to provide accommodation for the heads of the tie rods, support zones are provided at said ends of said rib and have an end fitting, a vertical wall of which constitutes both an element connecting said ends opposite said cylindrical edge of said central cupola shaped section of said rib and an element stopping rotation of a head of a corresponding tie rod.

8. A bearing in accordance with claim 6, in which at the level of tie rod support zones, that is to say at said ends of said rib, side vertical walls of said rib, located on either side of apertures provided for passage of the tie rods, are arranged as near as possible to one another and at a distance less than the width of the heads of the tie rods.

9. A bearing in accordance with claim 6, in which said cylindrical edge of said central cupola-shaped section of the bearing is connected to said cylindrical skirt of the bearing by a section shaped as a truncated cone, whereby rigidity of the bearing is further improved.

10. A bearing in accordance with claim 1, in which at the level of tie rod support zones, that is at said ends of said rib, side vertical walls of said rib, located on either side of apertures for passage of the tie rods, are arranged as near as possible to one another and at a distance less than the width of the heads of the tie rods.

* * * * *